(No Model.)

J. ABBEE.
STUMP EXTRACTOR.

No. 498,150. Patented May 23, 1893.

Witnesses

Inventor
Jerome Abbee
Attorney

UNITED STATES PATENT OFFICE.

JEROME ABBEE, OF RENO, NEVADA.

STUMP-EXTRACTOR.

SPECIFICATION forming part of Letters Patent No. 498,150, dated May 23, 1893.

Application filed November 17, 1892. Serial No. 452,308. (No model.)

*To all whom it may concern:*

Be it known that I, JEROME ABBEE, of Reno, in the county of Washoe and State of Nevada, have invented certain new and useful Improvements in Stump-Extractors; and I do hereby declare the following to be a full, clear, and exact description of the invention, such as will enable others skilled in the art to which it appertains to make and use the same.

This invention relates to a new and improved stump extractor, and has for its object the production of a cheap and simple device of this character in which a strong leverage is secured for easily and readily raising or extracting a stump.

The invention comprises a main winding drum over which a rope or chain is passed, and a triangular frame having wheels or rollers at one end, said rope or chain being connected to the other end of said frame, and a chain secured to the central portion of the latter frame for passing around the stump or other article to be raised.

The invention further comprises a main frame, a winding drum mounted therein and a second winding drum around the axle of which the rope from the first winding drum is passed, a rope being passed around said second winding drum and connected to a windlass supported by bars extending outwardly from said frame.

The invention further comprises the detail construction, combination and arrangement of parts, substantially as hereinafter fully set forth and particularly pointed out in the claims.

Figure 1:
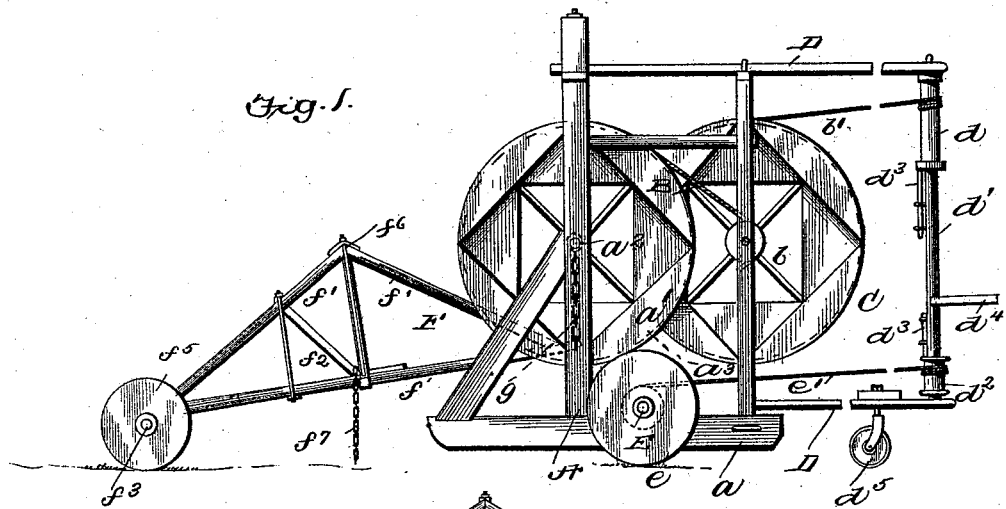
Figure 2:
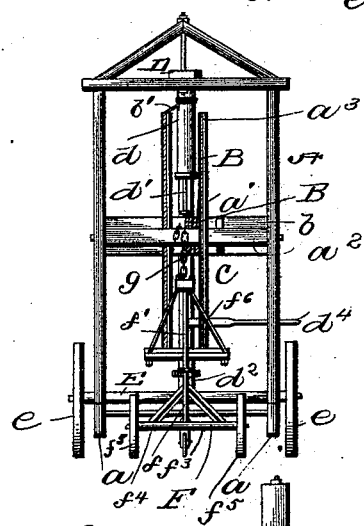
Figure 3:
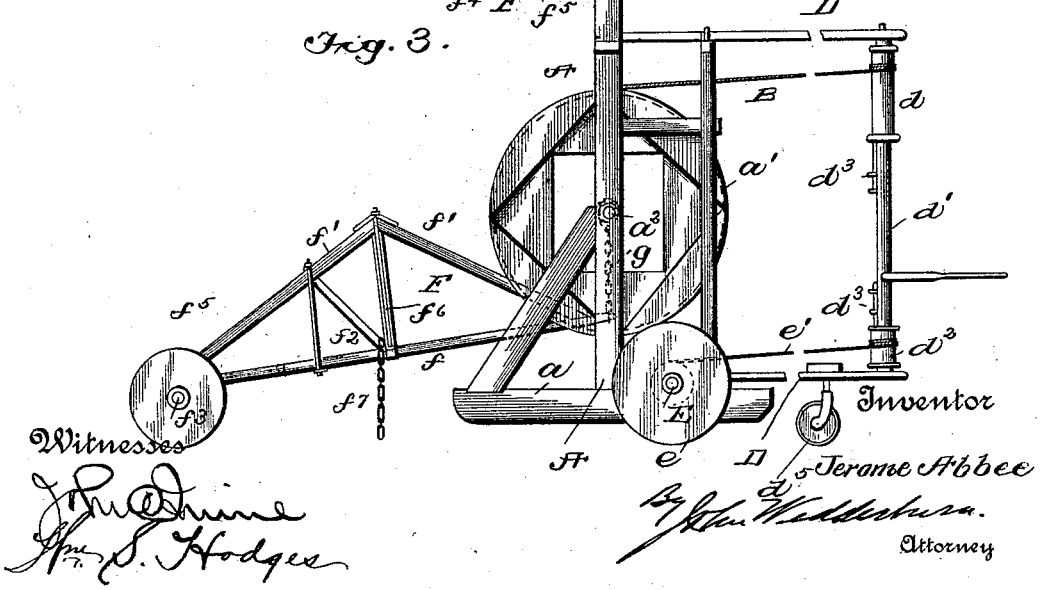

In the accompanying drawings:—Figure 1 is a view in side elevation of my improved stump extractor. Fig. 2 is a rear end view thereof. Fig. 3 is a view of a slightly modified form.

Referring to the drawings, A designates a main frame having lower supporting bars $a$. Within this frame is a main power drum $a'$, whose shaft $a^2$ is supported at its ends so as to revolve by two of the vertical bars or posts of frame A. In the periphery of this drum $a'$ is a circumferential groove $a^3$ in which is wound a rope B, the inner end thereof being secured to said wheel. In Figs. 1 and 2 I have shown this rope as being passed around the rotary shaft $b$ of a second winding drum C, and in a groove in the periphery of said drum C is a second rope $b'$. This rope is extended from said drum to and passed around a drum $d$ on a windlass shaft $d'$. A second drum $d^2$ is on this shaft, and both drums can be held fast to the shaft by keys $d^3$. The ends of the vertical shaft $d'$ are supported by upper and lower horizontal bars D secured at their inner ends to frame A. A hitching bar $d^4$ is secured to shaft $d'$ for connection of draft-horse power. To the lower horizontal bar D is secured a caster wheel $d^5$ to support and guide the frame in its forward movement.

Through the lower portion of frame A is passed transversely an axle E the same being supported by suitable bearings and upon the ends of said axle are wheels $e$. Upon these wheels the frame can be moved from point to point. Around this axle is passed a rope or chain $e'$ which is designed to be connected at its outer end to a drum $d^2$ on the windlass shaft $d'$. By this means the axle and wheel can be made to revolve to effect the transportation of the same from place to place.

F is a triangular frame which comprises a lower longitudinal bar $f$, upper inclined bars $f'$, brace-bars $f^2$, and an axle $f^3$ at its rear end braced by bars $f^4$. Upon this axle are wheels $f^5$. Nutted rods $f^6$ serve to increase the strength of the frame. To the center of the longitudinal bar $f$ is secured a chain $f^7$ which is designed to be connected with the stump to be hoisted. A chain $g$, secured to and passed around shaft $a^2$ of power drum $a'$, is connected at its outer, free end to the inner end of frame F. Hence by turning the windlass the power drums $a'$ and C will be revolved, and the winding of chain $g$ on shaft $a^2$, will effect the elevation of lifting frame F at its inner end, its outer end being free to move toward the main frame by reason of the supporting rollers. In this way a strong and highly efficient hoisting machine for extracting stumps is produced.

It is obvious that by employing two winding drums an accelerated power is obtained, but I do not restrict myself in this regard, for, as shown in Fig. 3, the second drum may be omitted, and the rope B passed direct from winding drum $a'$ to the windlass.

The advantages of my invention are apparent to those skilled in the art to which it appertains, and it will be specially observed that by means thereof a stump can be readily and easily extracted and that a superior lifting power or leverage is obtained.

I claim as my invention—

1. The herein-described improved stump extractor, comprising the main frame, the windlass, the horizontal rotary shaft having a drum, a rope encompassing said drum, the triangular frame having rollers at its outer end and a chain at its inner end encompassing said shaft, and the central chain depending from said latter frame, substantially as set forth.

2. The herein-described improved stump extractor comprising the main frame, the horizontal rotary shafts mounted in said frame, the drums thereon, the outwardly extended horizontal bars, the perpendicular windlass drum supported at the outer ends thereof, the ropes encircling said drums and secured one to one of said horizontal shafts and the other to said windlass drum, the triangular frame having rollers at its outer end and provided with a central depending chain, and the chain connected to the inner end of said frame and also secured to and passed around one of said shafts, substantially as set forth.

3. The herein-described improved stump extractor, comprising the frame, the shaft $a^2$ mounted therein, the winding drum thereon having a circumferential groove, the second winding drum together with its shaft, the rope passed around said first drum and connected to said latter shaft, the windlass, the rope connected thereto and to said second winding drum, the triangular frame having rollers at its outer end and the chain connected thereto and to said shaft $a^2$, substantially as set forth.

In testimony whereof I have signed this specification in the presence of two subscribing witnesses.

JEROME ABBEE.

Witnesses:
T. V. JULIEN,
THOS. E. HAYDON.